(12) United States Patent
Li et al.

(10) Patent No.: US 9,496,066 B2
(45) Date of Patent: Nov. 15, 2016

(54) BORON-DOPED LITHIUM-RICH MANGANESE BASED MATERIALS AND PREPARATION METHODS FOR LI-ION BATTERY CATHODE

(71) Applicant: Peking University, Beijing (CN)

(72) Inventors: Biao Li, Beijing (CN); Jin Ma, Beijing (CN); Dingguo Xia, Beijing (CN)

(73) Assignee: Peking University, Beijing (CN)

( * ) Notice: Subject to any disclaimer, the term of this patent is extended or adjusted under 35 U.S.C. 154(b) by 0 days.

(21) Appl. No.: 14/394,833

(22) PCT Filed: Nov. 5, 2013

(86) PCT No.: PCT/CN2013/086547
§ 371 (c)(1),
(2) Date: Oct. 16, 2014

(87) PCT Pub. No.: WO2015/018137
PCT Pub. Date: Dec. 2, 2015

(65) Prior Publication Data
US 2016/0181605 A1 Jun. 23, 2016

(51) Int. Cl.
*H01B 1/08* (2006.01)
*H01M 4/525* (2010.01)
(Continued)

(52) U.S. Cl.
CPC .............. *H01B 1/08* (2013.01); *C01B 13/36* (2013.01); *C01G 45/006* (2013.01); *C01G 45/1228* (2013.01); *C01G 51/006* (2013.01); *C01G 51/50* (2013.01); *C01G 53/006* (2013.01); *C01G 53/50* (2013.01); *H01M 4/0471* (2013.01); *H01M 4/0497* (2013.01); *H01M 4/131* (2013.01); *H01M 4/505* (2013.01); *H01M 4/525* (2013.01); *C01P 2002/50* (2013.01);
(Continued)

(58) Field of Classification Search
CPC ...... H01B 1/08; H01M 4/505; H01M 4/525; H01M 4/131; H01M 4/1391; H01M 4/5825; H01M 4/0497; H01M 4/0471; C01G 45/006; C01G 45/1228; C01G 51/006; C01G 51/50; C01G 53/006; C01G 53/50; C01B 13/36; C01D 15/02
See application file for complete search history.

(56) References Cited

U.S. PATENT DOCUMENTS 6,325,988 B1 * 12/2001 Inoue ................. C01G 45/1242
423/599
7,341,532 B2 * 3/2008 Ichida ...................... B62M 25/08
474/70
(Continued)

FOREIGN PATENT DOCUMENTS

DE WO 2005081338 A1 * 9/2005 ......... C01G 45/1228
JP EP 1372202 A1 * 12/2003 ............ H01M 4/505

*Primary Examiner* — Mark Kopec
*Assistant Examiner* — Matthew R Diaz
(74) *Attorney, Agent, or Firm* — SV Patent Service

(57) ABSTRACT

The present application discloses boron-doped lithium rich manganese based materials for cathodes of lithium ion batteries. The disclosed cathode materials can be prepared by co-precipitation and sol-gel methods. The chemical formula of this cathode material is $Li[Li_aMn_bCo_cNi_dB_x]O_2$ (a+b+c+d+x=1, a, b, x>0, c≥0, d≥0, c+d>0). Lithium ion batteries using these cathode materials show impressive improvements in performance and increased tap density at low level of boron doping. The co-precipitation method is particularly suitable for large-scale industrial production. The sol-gel method is simple and can produce fine and uniform particles.

5 Claims, 2 Drawing Sheets

(51) Int. Cl.
*H01M 4/505* (2010.01)
*H01M 4/131* (2010.01)
*H01M 4/04* (2006.01)
*C01B 13/36* (2006.01)
*C01G 45/00* (2006.01)
*C01G 45/12* (2006.01)
*C01G 51/00* (2006.01)
*C01G 53/00* (2006.01)
*H01M 4/02* (2006.01)

(52) U.S. Cl.
CPC ...... *C01P 2002/52* (2013.01); *C01P 2002/54* (2013.01); *C01P 2002/72* (2013.01); *C01P 2004/03* (2013.01); *C01P 2006/11* (2013.01); *C01P 2006/40* (2013.01); *H01M 2004/028* (2013.01); *Y02E 60/122* (2013.01)

(56) References Cited

U.S. PATENT DOCUMENTS

| | | | | |
|---|---|---|---|---|
| 7,556,655 | B2 * | 7/2009 | Dahn | C01G 53/006 429/231.1 |
| 2005/0266313 | A1 * | 12/2005 | Kitao | H01M 4/364 429/231.1 |
| 2008/0280205 | A1 * | 11/2008 | Jiang | C01G 53/006 429/223 |
| 2010/0247986 | A1 * | 9/2010 | Toyama | H01M 4/366 429/61 |
| 2011/0076564 | A1 * | 3/2011 | Yu | H01M 4/366 429/231.1 |

* cited by examiner

BORON-DOPED LITHIUM-RICH MANGANESE BASED MATERIALS AND PREPARATION METHODS FOR LI-ION BATTERY CATHODE

BACKGROUND OF THE INVENTION

This invention relates to lithium ion batteries and electrochemical science, and further relates to boron-doped lithium-rich manganese based cathode materials with its preparation method.

Lithium-ion battery is a kind of secondary battery that can be recharged; it has a 20 year history of development. Its applications include areas such as entertainment, transportation, military, medical treatment, and telecommunications, etc. Recently developed electrical vehicles that employ lithium ion batteries are environmentally friendly and high application prospects, but their popularity is limited for the time being due to the low energy density of the lithium ion batteries. The cathode material is the main factor that limits the energy density of Li ion batteries. Common cathode materials on the market include $LiCoO_2$, $LiFePO_4$, and $LiMn_2O_4$, etc., all of which have energy capacity below 200 mA h/g. Thus there is an urgent need to find a cathode material with high energy density.

Lithium rich manganese based material $xLi_2MnO_3 \cdot (1-x)LiMO_2$ (in which M is a combination of Co, Ni, and Mn in a random ratio, e.g. $Ni_{0.5}Mn_{0.5}$, $Ni_{1/3}Mn_{1/3}Co_{1/3}$) has attracted the most attention due to its high specific capacity (>250 mA h/g). This material was evolved from Numata's work on composite $Li_2MnO_3 \cdot LiCoO_2$ first proposed in 1999 (Solid state Ionics 1999, 118, 117). The structure of Li-rich manganese based material is still under debate: J. Dahn's (Chem. Mater., 2003, 15, 3214-3220) and J. Ferreira's (Chem. Mater., 2011, 23, 3614-3621) groups believes that it is a solid solution, while Pan's group (Chem. Mater., 2002, 14, 2289-2299) thought it was a pseudo nano composite material instead of a solid solution, whereas Zhou's and Ikuhara's groups consider it as a bi-phase coexisting structure, which is supported by TEM evidence.

Although Li-rich materials have high specific energy capacities, their commercial applications are greatly limited by their short cycle life. Specifically, their capacities rapidly decay to zero after 150 charging-discharging cycles as the result of spinel phase transition, particle fragmentations, and surface corrosions. After 300 charging-discharging cycles, the specific capacity drops to below less than 100 mA h/g, and eventually falls to zero. (ACS Nano, 2013, 7 (1), pp 760-767). Because of these drawbacks, the commercial applications of Li-rich materials are severely limited. There is therefore a need to improve the properties of these materials to improve the materials' performance over a large number of charging-discharging cycles.

SUMMARY OF THE INVENTION

The present invention is aimed to overcome the above described drawbacks in conventional technologies. The disclosed application provides a boron-doped lithium rich manganese based material and associated preparation method for cathodes in Li-ion batteries. The structure of Li-rich material is stabilized by boron doping, which improves performance of charging-discharging cycles of the Li-rich battery cathode materials. The improvement is particularly significant at long charging-discharging cycles.

DETAILED DESCRIPTION OF THE INVENTION

Figure 1:
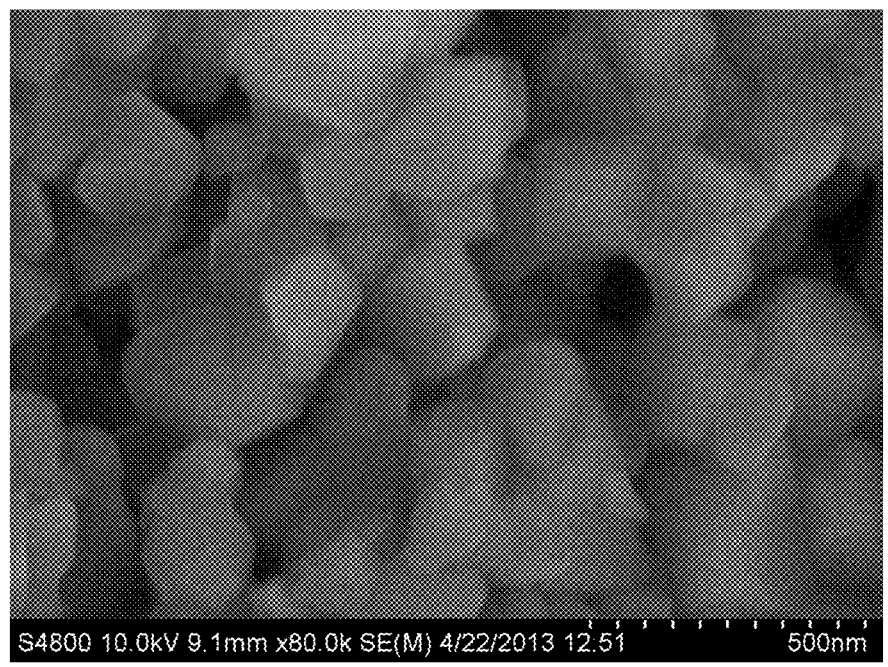
FIG. 1 is a Scanning Electron Micrograph of a 2% boron-doped lithium rich manganese based material described in Implementation Example 1.

The following approach is used to realize the above described improvements:

Boron-doped lithium rich manganese based materials are developed for the cathodes of Li-ion batteries. The materials have a chemical formula of $Li[Li_aMn_bCo_cNi_dB_x]O_2$, in which $a+b+c+d+x=1$, a, b, $x>0$, $c \geq 0$, $d \geq 0$, $c+d>0$.

In a further aspect, the above described boron-doped lithium rich cathode materials can be prepared by the following methods:

(1) Co-Precipitation Method a. A manganese salt, a nickel salt, and/or a cobalt salt are first dissolved into the deionized water at stoichiometric proportions as specified in the chemical formula above to prepare for a salt solution with an ionic concentration of 0.5~1.5 mol/L. Next, NaOH and ammonium hydroxide are dissolved in a deionized water to form a mixed alkali solution.

b. Introducing the salt solution and the alkali solution at constant speed into a vessel containing deionized water, while keeping pH between 10 and 12, and temperature between 50° C. and 70° C.;

c. Keeping the suspension obtained in b step standing for about 8-16 hours, and then filtering the distilled product and wash it with deionized water to obtain a hydroxide precursor product.

d. Adding lithium compound at 5% higher than its associated stoichiometric ratio based on the chemical formula above to the hydroxide precursor produce. After grinding, the powder is presintered at a temperature between 400° C. and 600° C. for 3-5 hours;

e. Adding a boracic compound at stoichiometric ratio to the presintered powder obtained in step d; grinding to mix the mixture homogeneously; the mixture is sintered for 10-16 hours at 800° C. and 900° C. to obtain a target product.

In step a, the manganese salt can be selected from one or several of manganese nitrate, manganese sulfate, and manganese chloride. The nickel salt can be selected from one or several of nickel nitrate, nickel sulfate, and nickel chloride. The cobalt salt can be selected from one of several of cobalt nitrate, cobalt sulfate, and cobalt chloride.

In step a, the molar amount of NaOH in the mixed alkali solution is twice of the total molar amount of the manganese, nickel, and cobalt salts, which is used as a precipitant. The molar amount of ammonium hydroxide is half of that of NaOH, which is used as a buffer agent.

In step b, the salt solution and alkali solution are added with a peristaltic pump respectively into a container holding some deionized water with the pumping speed controlled in a range between 0.8 and 1.8 ml/min.

In step d, the lithium compound can include LiOH or $Li_2CO_3$.

In step e, the boracic compound can include $B_2O_3$, $H_3BO_3$, or $LiBO_2$.

(2) Sol-Gel Method a. A manganese salt, a nickel salt, and/or a cobalt salt, a lithium compound, a boracic compound, an ethylene glycol, and a citric acid, at stoichiometric proportions as specified in the chemical formula above, are dissolved in deionized water to form a sol;

b. The sol is evaporated in vacuum to for a gel;

c. The gel is dried in vacuum between 120° C. and 150° C. for at least 5-8 hours. After grinding, the gel is pre-calcined between 400° C. and 500° C. for 3-6 hours, and then sintered at 800-900° C. for 10-16 hours, to obtain the target product.

In step a, the manganese salt can be selected from one or several of manganese acetate, manganese nitrate, manganese sulfate, and manganese chloride. The nickel salt can be selected from one or several of nickel acetate, nickel nitrate, nickel sulfate, and nickel chloride. The cobalt salt can be selected from one of several of cobalt acetate, cobalt nitrate, cobalt sulfate, or cobalt chloride. The lithium compound can include one or several of lithium acetate, lithium nitrate, lithium sulfate, or lithium chloride. The boracic compound can include one or several of $B_2O_3$, $H_3BO_3$, or $LiBO_2$.

In step a, the molar amount of the lithium compound exceeds the stoichiometric ratio by about 5%.

In step b, the sol can be evaporated by a rotary evaporator with its temperature set between 80° C. and 100° C. and a rotation speed at 50-60 rpm.

The above described methods can both be used to prepare the presently disclosed cathode materials.

The presently disclosed materials and method have more of the following benefits in comparison to conventional technologies:

The presently disclosed materials and preparation methods have demonstrated impressive performance improvement at very low level of boron doping. At just 2% boron's doping level, the reversible capacity of the cathode can exceed 290 mA h/g after 80 charging-discharging cycles at a current density of 20 mA/g, and can exceed 200 mA h/g after 250 charging-discharging cycles at a current density of 60 mA/g. Meanwhile, the tap density of the lithium-rich cathode material can be increased from 0.81 g/ml to 0.90 g/ml by doping boron at a 2% level, and to 1.47 g/ml by 8% boron doping level. The precursor in the presently disclosed invention can be made by a co-precipitation method, which is compatible with industrial manufacturing. The sol-gel method is simple, and can produce uniform and fine particles.

These and other aspects, their implementations and other features are described in detail in the drawings, the description and the claims.

The present invention will hereinafter be described in further detail by examples. However, it is to be understood that these examples can be modified into other various forms, and the scope of the present invention is not intended to be limited to such examples.

Implementation Example 1. 2% Boron-Doped Lithium Rich Manganese Based Material $Li[Li_{0.2}Mn_{0.534}Ni_{0.123}Co_{0.123}B_{0.02}]O_2$ Prepared by Sol-Gel Method First 0.215 g of lithium acetate, 0.788 g of nickel acetate, 3.229 g of manganese acetate, 0.789 g of cobalt acetate, 0.031 g of boric acid, 12.615 g of citric acid, and 4.966 g ethylene glycol are dissolved in 350 ml of deionized water to form a sol. The sol is stirred uniformly and then transferred to a pear-shaped bottle. The sol is evaporated to form gel using a rotary evaporator at a setting temperature of 80° C. and a rotation speed of 55 rpm. After that, the gel is dried in a vacuum oven at 150° C. for 5 hours. The dried gel was then ground and pre-calcined in a tube furnace at 450° C. for 4 hours, and followed by sintering at 900° C. for 15 hours to obtain the target product $Li[Li_{0.2}Mn_{0.534}Ni_{0.123}Co_{0.123}B_{0.02}]O_2$.

Figure 2:
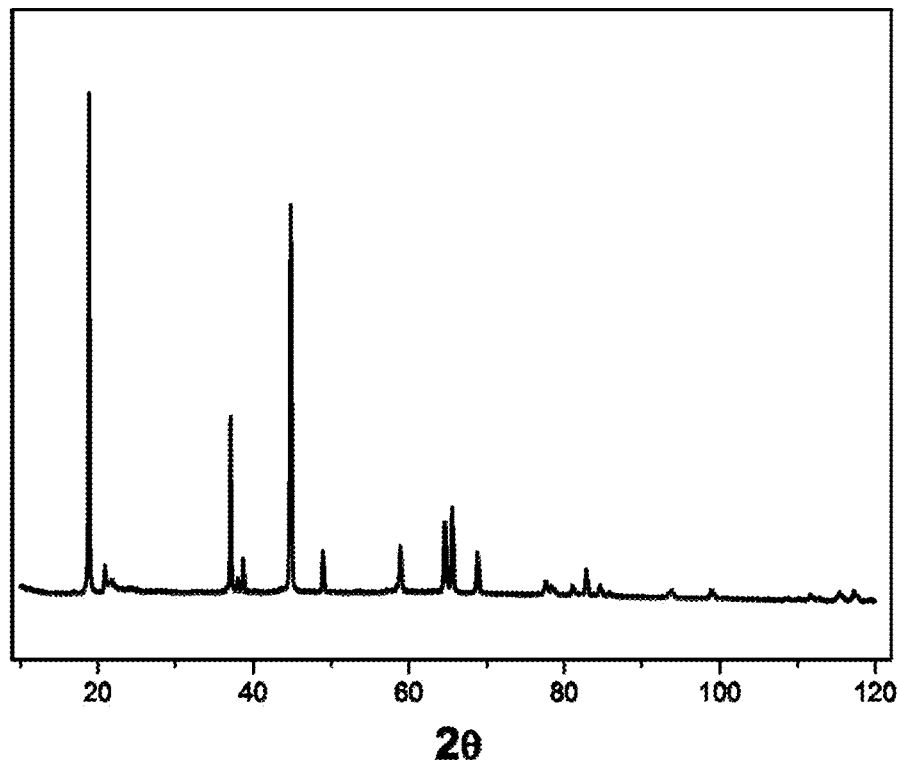
FIG. 2 shows the X-ray diffraction pattern of a 2% boron-doped lithium rich manganese based material described in Implementation Example 1.
Figure 3:
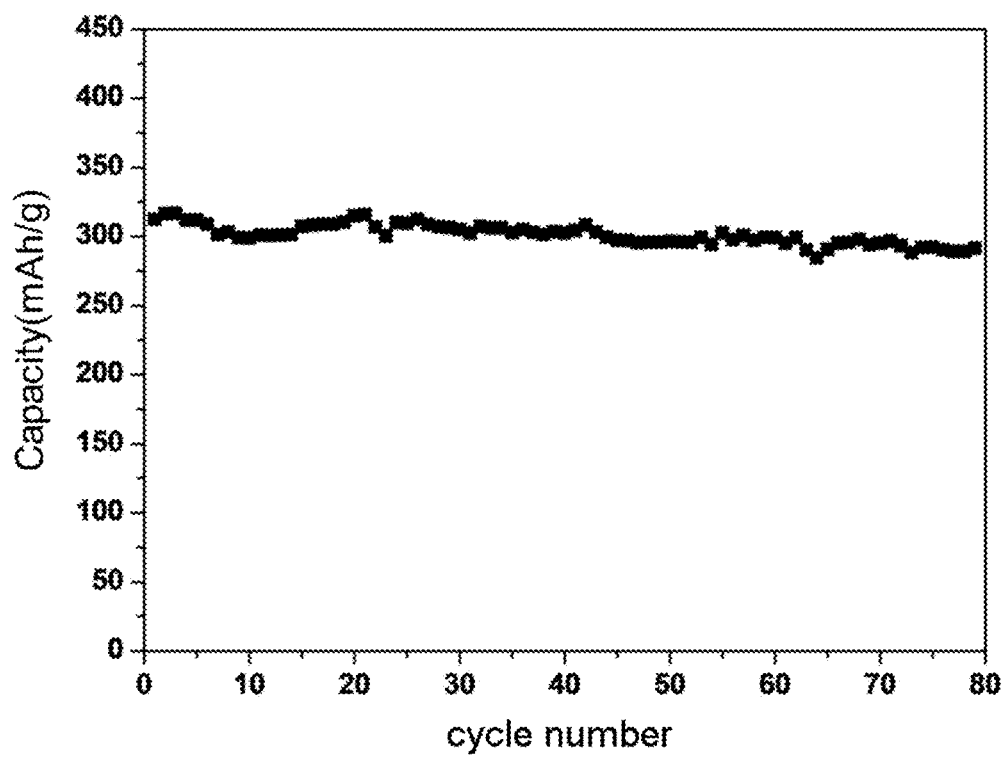
FIG. 3 shows performance of a 2% boron-doped lithium rich manganese based material over charging-discharging cycles at a current density of 20 mA/g as described in Implementation Example 1.

The target product, as shown by the scanning electron micrograph in FIG. 1, include particles with diameters between 100 and 250 nm, which is larger than particles in the sample without boron doping. On the other hand, the X-ray diffraction pattern in FIG. 2 shows that the crystal structure of the boron-doped sample does not change much compared to that of the undoped sample.

To prepare a test cell of a lithium ion battery, the target product is mixed with Super P Carbon Black and polyvinylidene fluoride (PVDF) at an 8:1:1 ratio, and ground with a solvent N-Methyl Kelopyrrolidide on an aluminum foil. The mixture is dried at 120° C. for an hour. The mixture is then pressed by a rolling machine a few times, and then cut to disks to form cathodes for the test batteries. Lithium metal disks are used as anodes for the test cells. Whatman glass microfiber filter (GF/D) is used as the separator. The high voltage battery electrolyte was obtained from Beijing Institute of Chemical Reagents. Coin cells are packaged in an argon filled glove box, and tested in a NEWARE battery testing system at room temperature (25° C.).

Figure 4:
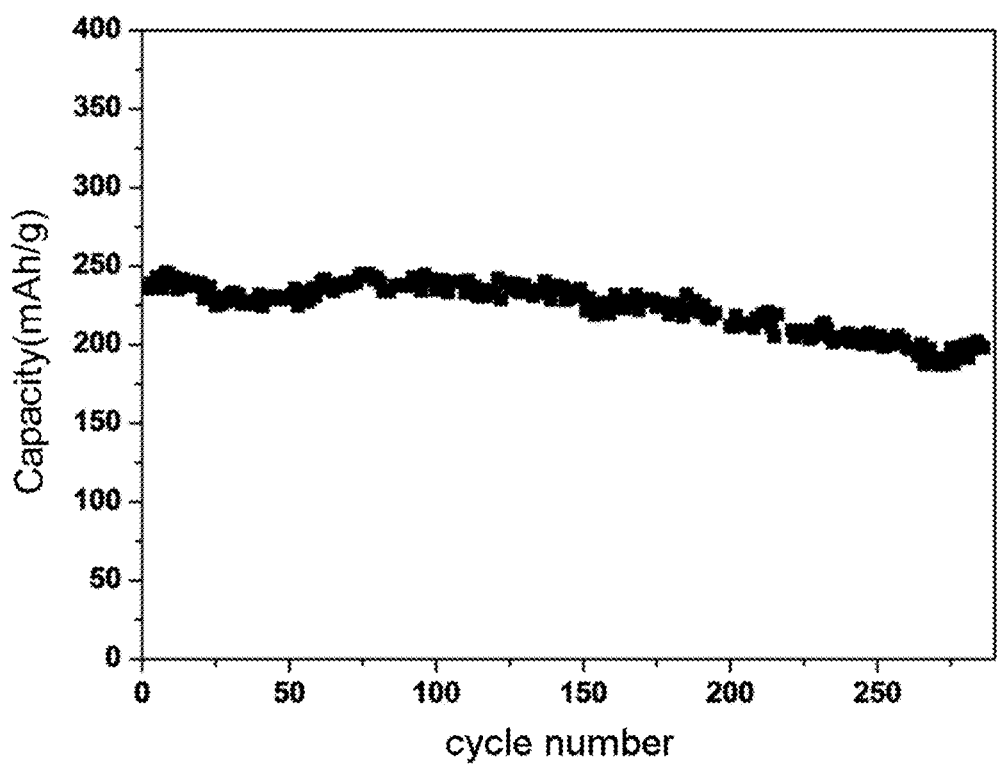
FIG. 4 shows performance of a 2% boron-doped lithium rich manganese based material over charging-discharging cycles at a current density of 60 mA/g as described in Implementation Example 1.

The cathode material prepared in this implementation has a tap density of 0.90 g/ml, and can deliver 312 mA h/g in the first cycle at 20 mA/g between 2.0 and 4.8 V and 292 mA h/g in the $80^{th}$ cycle, which represents a capacity retention as high as 93.5%. At a current density of 60 mA/g, as shown in FIG. 4, the initial discharge capacity is 245 mA h/g, and the $250^{th}$ discharge capacity can still reach 204 mA h/g, which achieves a capacity retention of 83%.

Implementation 2. 4% Boron-Doped Lithium Rich Manganese Based Material $Li[Li_{0.2}Mn_{0.52}Ni_{0.12}Co_{0.12}B_{0.04}]O_2$ Prepared by Sol-Gel Method First 3.215 g lithium acetate, 0.747 g nickel acetate, 3.191 g manganese acetate, 0.748 g cobalt acetate, 0.062 g boric acid, 12.610 g citric acid, and 4.969 g ethylene glycol are dissolved into 350 ml of deionized water to form a sol. After stirring, the sol is transferred to a pear-shaped bottle. The sol is evaporated at 80° C. to form gel using the rotary evaporator rotating at 55 rpm. The gel is then dried in a vacuum oven at 150° C. for 5 hours. The dried gel was then ground and precalcined in the tube furnace at 450° C. for 4 hours, and followed by sintering at 900° C. for 15 hours to obtain the target product $Li[Li_{0.2}Mn_{0.52}Ni_{0.12}Co_{0.12}B_{0.04}]O_2$.

To prepare a test cell of a lithium ion battery, the target product is mixed with Super P Carbon Black and polyvinylidene fluoride (PVDF) at an 8:1:1 ratio, and ground with a solvent N-Methyl Kelopyrrolidide on an aluminum foil.

The mixture is dried at 120° C. for an hour. The mixture is then pressed by a rolling machine a few times, and then cut to disks to form cathodes for the test batteries. Lithium metal disks are used as anodes for the test cells. Whatman glass microfiber filter (GF/D) is used as the separator. The high voltage battery electrolyte was obtained from Beijing Institute of Chemical Reagents. Coin cells are packaged in an argon filled glove box, and tested in a NEWARE battery testing system at room temperature (25° C.).

The cathode material prepared in this implementation has a tap density of 1.21 g/ml. The test cell can deliver a capacity of 240 mA h/g in the first cycle and 232 mA h/g in the $80^{th}$ cycle at a current density of 20 mA/g between 2.0 and 4.8 V, which represents a capacity retention as high as 96.7%. At a current density of 60 mA/g, the initial discharge capacity is 190 mA h/g, and the $250^{th}$ discharge capacity can still reach 178 mA h/g, which represents a capacity retention of 93.6%.

Implementation 3. 8% Boron-Doped Lithium Rich Manganese Based Material $Li[Li_{0.2}Mn_{0.514}Ni_{0.103}Co_{0.103}B_{0.08}]O_2$ Prepared by Sol-Gel Method First 3.221 g lithium acetate, 0.667 g nickel acetate, 3.107 g manganese acetate, 0.665 g cobalt acetate, 0.125 g boric acid, 12.626 g citric acid, and 4.966 g ethylene glycol are dissolved into 350 ml of deionized water to form sol. After stirring, the sol is transferred to a pear-shaped bottle. The sol is evaporated at 80° C. to form gel using the rotary evaporator rotating at 55 rpm. The gel is then dried in a vacuum oven at 150° C. for 5 hours. The dried gel was then ground and precalcined in the tube furnace at 450° C. for 4 hours, and followed by sintering at 900° C. for 15 hours to obtain the target product $Li[Li_{0.2}Mn_{0.514}Ni_{0.103}Co_{0.103}B_{0.08}]O_2$.

To prepare a test cell of a lithium ion battery, the target product is mixed with Super P Carbon Black and polyvinylidene fluoride (PVDF) at an 8:1:1 ratio, and ground with a solvent N-Methyl Kelopyrrolidide on an aluminum foil. The mixture is dried at 120° C. for an hour. The mixture is then pressed by a rolling machine a few times, and then cut to disks to form cathodes for the test batteries. Lithium metal disks are used as anodes for the test cells. Whatman glass microfiber filter (GF/D) is used as the separator. The high voltage battery electrolyte was obtained from Beijing Institute of Chemical Reagents. Coin cells are packaged in an argon filled glove box, and tested in a NEWARE battery testing system at room temperature (25° C.).

The cathode material prepared in this implementation has a tap density of 1.47 g/ml. The test cell can deliver a capacity of 173 mA h/g in the first cycle and 195 mA h/g in the $80^{th}$ cycle at a current density of 20 mA/g between 2.0 and 4.8 V, which represents a capacity retention as high as 113%. At a current density of 60 mA/g, the initial discharge capacity is 147 mA h/g, and the $250^{th}$ discharge capacity can still reach 154 mA h/g, which represents a capacity retention of 105%.

Implementation 4. 2% Boron-Doped Lithium Rich Manganese Based Material $Li[Li_{0.2}Mn_{0.59}Ni_{0.19}B_{0.02}]O_2$ Prepared by Sol-Gel Method First 2.576 g lithium acetate, 0.968 g nickel acetate, 2.892 g manganese acetate, 0.025 g boric acid, 12.651 g citric acid, and 4.968 g ethylene glycol are dissolved into 350 ml deionized water to form sol. After stirring, the sol is transferred to a pear-shaped bottle. The sol is evaporated at 80° C. to form gel using the rotary evaporator rotating at 55 rpm. The gel is then dried in a vacuum oven at 150° C. for 5 hours. The dried gel was then ground and precalcined in the tube furnace at 450° C. for 4 hours, and followed by sintering at 900° C. for 15 hours to obtain the target product $Li[Li_{0.2}Mn_{0.59}Ni_{0.19}B_{0.02}]O_2$.

To prepare a test cell of a lithium ion battery, the target product is mixed with Super P Carbon Black and polyvinylidene fluoride (PVDF) at an 8:1:1 ratio, and ground with a solvent N-Methyl Kelopyrrolidide on an aluminum foil. The mixture is dried at 120° C. for an hour. The mixture is then pressed by a rolling machine a few times, and then cut to disks to form cathodes for the test batteries. Lithium metal disks are used as anodes for the test cells. Whatman glass microfiber filter (GF/D) is used as the separator. The high voltage battery electrolyte was obtained from Beijing Institute of Chemical Reagents. Coin cells are packaged in an argon filled glove box, and tested in a NEWARE battery testing system at room temperature (25° C.).

The cathode material prepared in this implementation has a tap density of 0.91 g/ml. The lithium ion battery test cell can deliver a capacity of 268 mA h/g in the first cycle and 257 mA h/g in the $80^{th}$ cycle at a current density of 20 mA/g between 2.0 and 4.8 V, which represents a capacity retention as high as 95.9%. At a current density of 60 mA/g, the initial discharge capacity is 223 mA h/g, and the $250^{th}$ discharge capacity can still reach 207 mA h/g, which represents a capacity retention of 92.8%.

Implementation 5. 2% Boron-Doped Lithium Rich Manganese Based Material $Li[Li_{0.2}Mn_{0.59}Ni_{0.19}B_{0.02}]O_2$ Prepared by Co-Precipitation Method 3.603 g $NiSO_4.6H_2O$ and $MnSO_4.H_2O$ are dissolved into 100 ml deionized water to form a salt solution Then 8.892 g of NaOH (10% excess) and 6 ml of 18.4 mol/L ammonium hydroxide are mixed to obtain 110 ml of alkali solution. Then added drops of the alkali solution into a vessel containing 50 ml of deionized water to raise pH to 12. The salt solution and the alkali solution are added simultaneously into the vessel, with the mixture solution heated at 60° C. and stirred at 500 rpm.

After the co-precipitation, the suspension was stood for above 12 hours, and then filtered. Then filtered precipitate is washed three times, dried in the vacuum oven at 80° C. for 8 hours, and ground to a fine powder, which produces a precursor.

1.0487 g of the above described precursor is mixed with 0.9182 g (5% excess) $LiOH.H_2O$ and ground uniformly. The mixture is pre-calcined in the tube furnace at 500° C. for 4 hours. Afterwards, 0.00386 g of $B_2O_3$ is added to the composite and ground, and calcined again in the tube furnace at 850° C. for 12 hours to obtain the target product $Li[Li_{0.2}Mn_{0.59}Ni_{0.19}B_{0.02}]O_2$.

To prepare a test cell of a lithium ion battery, the target product is mixed with Super P Carbon Black and polyvinylidene fluoride (PVDF) at an 8:1:1 ratio, and ground with a solvent N-Methyl Kelopyrrolidide on an aluminum foil. The mixture is dried at 120° C. for an hour. The mixture is then pressed by a rolling machine a few times, and then cut to disks to form cathodes for the test batteries. Lithium metal disks are used as anodes for the test cells. Whatman glass microfiber filter (GF/D) is used as the separator. The high voltage battery electrolyte was obtained from Beijing Institute of Chemical Reagents. Coin cells are packaged in an argon filled glove box, and tested in a NEWARE battery testing system at room temperature (25° C.).

The cathode material prepared in this implementation has a tap density of 0.95 g/ml. The lithium-ion battery test cell can deliver a capacity of 265 mA h/g in the first cycle and 255 mA h/g in the 80$^{th}$ cycle at a current density of 20 mA/g between 2.0 and 4.8 V, which represents a capacity retention as high as 96%. At a current density of 60 mA/g, the initial discharge capacity is 188 mA h/g, and the 250$^{th}$ discharge capacity can still reach 172 mA h/g, which represents a capacity retention of 91.4%.

While this document contains many specifics, these should not be construed as limitations on the scope of an invention that is claimed or of what can be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or a variation of a sub-combination.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A method for preparing a cathode material for lithium ion batteries, comprising:
    a) dissolving a manganese salt, and at least one of a nickel salt or a cobalt salt in a deionized water to prepare for a salt solution with a concentration of 0.5-1.5 mol/L; and
    dissolving NaOH and ammonium hydroxide into deionized water to form a mixed alkali solution;
    b) adding the salt solution and the alkali solution into a deionized water in a container to obtain a mixed solution;
    c) standing the mixed solution for about 8-16 hours; filtering a precipitate from the mixed solution; and drying the precipitate to obtain a precursor product;
    d) adding a lithium compound to the precursor to obtain a powder; and sintering the powder between 400 and 600° C. for 3-5 hours; and
    e) adding a boracic compound to the powder to produce a mixture powder; and
    sintering the mixture powder between 800° C. and 900° C. for 10-16 hours to produce a cathode material for lithium ion batteries,
    wherein the cathode material comprises Lithium, Manganese, at least one of Cobalt or Nickel, and Boron, with compositions defined by a chemical formula of Li[Li$_a$Mn$_b$Co$_c$Ni$_d$B$_x$]O$_2$, wherein a+b+c+d+x=1, a>0, b>0, x>0, c≥0, d≥0, and c+d>0.

2. The method of claim 1, wherein the manganese salt is selected from a group consisting of manganese nitrate, manganese sulfate, and manganese chloride, wherein the nickel salt is selected from a group consisting of nickel nitrate, nickel sulfate, and nickel chloride, wherein the cobalt salt is selected from a group consisting of cobalt nitrate, cobalt sulfate, and cobalt chloride.

3. The method of claim 1, wherein NaOH in the mixed alkali solution has a molar amount twice of a total amount of the manganese salt, the nickel salt, and the cobalt salt, wherein ammonium hydroxide has half molar amount as NaOH in the mixed alkali solution.

4. The method of claim 1, wherein the salt solution and alkali solution are added to the deionized water by peristaltic pumps at pump speeds between 0.8 and 1.8 ml/min in step b), and wherein the mixed solution is kept at pH between 10 and 12, and a temperature at between 50° C. and 70° C. in step b), wherein the precipitate is washed with deionized water after filtering in step c).

5. The method of claim 1, wherein the lithium compound includes LiOH or Li$_2$CO$_3$ in step d), and wherein the boracic compound includes B$_2$O$_3$, H$_3$BO$_3$, or LiBO$_2$ in step e).

* * * * *